United States Patent
Wu et al.

(10) Patent No.: US 12,453,105 B2
(45) Date of Patent: Oct. 21, 2025

(54) MEMORY CHIPLET HAVING MULTIPLE ARRAYS OF MEMORY DEVICES AND METHODS OF FORMING THE SAME

(71) Applicant: Taiwan Semiconductor Manufacturing Company Limited, Hsinchu (TW)

(72) Inventors: Chao-I Wu, Zhubei (TW); Yu-Ming Lin, Hsinchu (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 167 days.

(21) Appl. No.: 17/412,365

(22) Filed: Aug. 26, 2021

(65) Prior Publication Data
US 2023/0062750 A1 Mar. 2, 2023

(51) Int. Cl.
*H10B 99/00* (2023.01)
(52) U.S. Cl.
CPC .................................. *H10B 99/00* (2023.02)
(58) Field of Classification Search
CPC ... H01L 25/18; H01L 25/065; H01L 25/0657; H10B 99/00; H10B 51/20; H10B 53/20
See application file for complete search history.

(56) References Cited

U.S. PATENT DOCUMENTS

| | | | | |
|---|---|---|---|---|
| 2005/0255663 A1* | 11/2005 | Natori | ..................... | H10B 53/00 257/E21.664 |
| 2009/0129186 A1* | 5/2009 | Schnell | ..................... | G11C 5/04 365/201 |
| 2010/0295136 A1* | 11/2010 | Or-Bach | ........... | H01L 21/76254 257/390 |
| 2015/0340366 A1* | 11/2015 | Lim | ....................... | G11C 5/025 257/401 |
| 2019/0267088 A1* | 8/2019 | Jeon | ..................... | H01L 23/5329 |
| 2020/0328186 A1* | 10/2020 | Liu | ......................... | H01L 25/50 |
| 2020/0328188 A1* | 10/2020 | Liu | ......................... | H01L 25/50 |
| 2021/0028148 A1* | 1/2021 | Wu | ..................... | H01L 21/7682 |
| 2021/0157751 A1* | 5/2021 | Kwon | ..................... | G11C 7/109 |
| 2022/0375529 A1* | 11/2022 | Yamazaki | .............. | G06N 3/063 |

* cited by examiner

*Primary Examiner* — Jesse Y Miyoshi
(74) *Attorney, Agent, or Firm* — The Marbury Law Group, PLLC

(57) ABSTRACT

A disclosed memory structure includes a first memory region including a first memory array of SRAM memory devices, a second memory region including a second memory array of 1T1C memory devices, and a third memory region including a third memory array of FeFET memory devices. The memory structure further includes at least one data bus laterally extending across the first memory region, the second memory region, and third memory region and configured to provide data transfer among the first memory array, the second memory array, and the third memory array. The memory structure further includes a plurality of peripheral circuit devices formed at a semiconductor material layer of the memory structure, the peripheral circuit devices configured to control the first memory array, the second memory array, and the third memory array. At least one of the second memory array and the third memory array may be a 3-dimensional memory array.

20 Claims, 7 Drawing Sheets

MEMORY CHIPLET HAVING MULTIPLE ARRAYS OF MEMORY DEVICES AND METHODS OF FORMING THE SAME

BACKGROUND

The semiconductor industry has continually grown due to improvements in integration density of various electronic components (e.g., transistors, diodes, resistors, capacitors, etc.). For the most part, these improvements in integration density have come from successive reductions in minimum feature size, which allows more components to be integrated into a given area.

In addition to smaller electronic components, improvements to the packaging of components have been developed in an effort to provide smaller packages that occupy less area than previous packages. Example approaches include quad flat pack (QFP), pin grid array (PGA), ball grid array (BGA), flip chips (FC), 3-dimensional integrated circuits (3DICs), wafer level packages (WLPs), package on package (PoP), System on Chip (SoC) or System on Integrated Circuit (SoIC) devices. Some of these 3-dimensional devices (e.g., 3DIC, SoC, SoIC) are prepared by placing chips over chips on a semiconductor wafer level. These 3-dimensional devices provide improved integration density and other advantages, such as faster speeds and higher bandwidth, because of the decreased length of interconnects between the stacked chips. However, there are many challenges related to 3-dimensional devices.

BRIEF DESCRIPTION OF THE DRAWINGS

Aspects of this disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
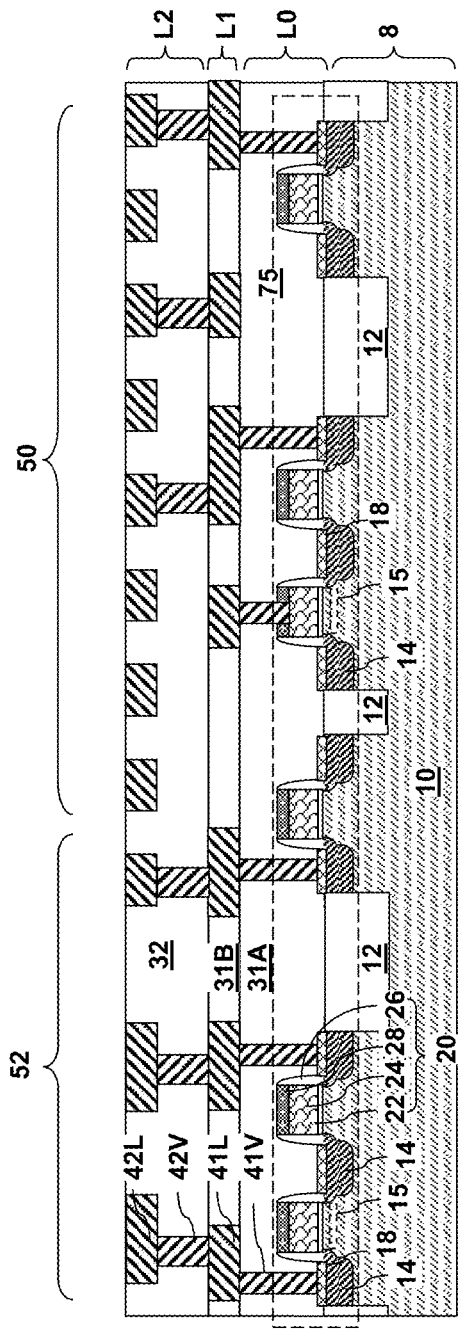
FIG. 1A is a vertical cross-sectional view of a first exemplary structure after formation of a first array of memory devices and prior to formation of a second array of memory devices, according to various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

The various embodiments disclosed herein are directed to a chiplet architecture in which multiple arrays of memory cells may be formed on a single die. Memory devices may be formed at a substrate layer in a front-end-of-line (FEOL) process, or may be formed at one or more interconnect levels during one or more respective middle-end-of-line (MEOL) and/or back-end-of-line (BEOL) processes. Memory devices may include a grid of independently functioning memory cells formed on a substrate. Memory devices may include volatile or non-volatile memory cells.

Volatile memory devices may include static random access memory (SRAM) cells, dynamic random access memory (DRAM) cells, etc. In contrast to volatile memory cells, which require constant power to retain their memory values, nonvolatile memory cells are capable of retaining information when power is not applied thereto. For example, computers including non-volatile memory cells do not need to be booted up when switched on. Emerging nonvolatile memory technologies may include resistive random-access memory (RRAM or ReRAM), magneto-resistive random-access memory (MRAM), ferroelectric (FE) random-access memory (FRAM, F-RAM, or FeRAM), and phase-change memory (PCM), for example.

FRAM is a random-access memory that utilizes memory cells that include a FE material to store information as FE polarization. An FE material has an equilibrium-state bulk electric dipole moment. This occurs in solid ceramics when ground state crystal structure involves spatial separation of ionic charges, and the unit cell lacks a center of symmetry. Nanoscale alignment of the microscopic electric dipole moments is responsible for bulk ferroelectric behavior. Typically, the magnitude of the dipole polarization and its orientation may be controlled by application of modest external electric fields. The change in orientation may be a good indication of the stored value.

FRAM is commonly organized in single-transistor, single-capacitor (1T1C) or two-transistor, two-capacitor (2T2C) configurations, in which each memory cell includes one or more access transistors. The non-volatility of an FRAM is due to the bi-stable characteristic of the FE material in the cell capacitor(s). The cells are typically organized in an array, such as folded-bit line, open-bit line architectures, etc., wherein the individual cells are selected by plate line and word line signals from address decoder circuitry, with the data being read from or written to the cells along bit lines using sense amplifier circuits.

In an open-bit line architecture, for example, the bit-lines may be divided into multiple segments, and differential sense amplifiers may be placed in between bit-line segments. Because the sense amplifiers may be placed between bit-line segments, to route their outputs outside the array, an additional layer of interconnect placed above those used to construct the word-lines and bit-lines may be required. The folded bit-line array architecture routes bit-lines in pairs throughout the array. The close proximity of the paired bit-lines may provide superior common-mode noise rejection characteristics over open bit-line arrays.

A folded-bit line architecture may be favored in DRAM integrated circuits for its superior noise immunity. This type architecture is referred to as folded because it takes its basis from the open array architecture from the perspective of the circuit schematic. The folded array architecture appears to remove DRAM cells in alternate pairs (because two DRAM cells share a single bit-line contact) from a column, then move the DRAM cells from an adjacent column into the voids.

Various embodiments disclosed herein may be advantageous for certain computing applications that require fast and very high-bandwidth memory access. In applications in neuromorphic computing and machine learning, for example, multiple fast high-bandwidth memory arrays are needed. For example, an array of SRAM devices may be used for computing memory and an array of DRAM devices may be used for working memory. Long-term storage may be provided, for example, by a 3-dimensional NAND array. Such a configuration, however, may have certain drawbacks. For example, latency of data transfer between the DRAM array and the 3-dimensional NAND array may limit bandwidth performance. Similar latency may also be an be a problem with data transfer between SRAM and DRAM devices.

Various embodiments disclosed herein overcome the above-described drawbacks by providing a memory structure having multiple memory arrays formed on a single die. In this regard, various disclosed embodiments may include an SRAM memory array at a semiconductor material level of a die, a DRAM or other 1T1C array above the SRAM array, and a 3-dimensional FRAM array above the DRAM or other 1T1C array. The memory structure may further include a data bus that allows massive data input/output (IO) between the three memory arrays (e.g., SRAM, 1T1C and 3D FRAM). For example, in one embodiment the data bus may be a 1024 bit data bus. Peripheral control devices may further be provided at the semiconductor material layer. Such peripheral devices may be configured to control data transfer between the various memory arrays. As the name suggest, in some embodiments, peripheral devices may be located out on the periphery of the memory arrays (outer edge of the memory array area). However, in various embodiments, the peripheral control circuitry may be located below the 1T1C and FRAM arrays to reduce the overall area of the memory structure. In addition, such a configuration may allow various embodiments to shorten the data bus connection. In this manner, the various embodiments may improve overall device speed and bandwidth of memory access. In some embodiments, bandwidth may be increased by factors of between 32 and 64 relative to conventional memory structures.

FIG. 1A is a vertical cross-sectional view of a first exemplary structure after formation of a first array of memory devices and prior to formation of a second array of memory devices, according to various embodiments. The first exemplary structure may include a substrate 8 that contains a semiconductor material layer 10. The substrate 8 may include a bulk semiconductor substrate such as a silicon substrate in which the semiconductor material layer continuously extends from a top surface of the substrate 8 to a bottom surface of the substrate 8, or a semiconductor-on-insulator layer including the semiconductor material layer 10 as a top semiconductor layer overlying a buried insulator layer (such as a silicon oxide layer). The exemplary structure may include various devices regions, which may include a memory array region 50 in which at least one array of memory cells may be subsequently formed. The memory cells may be volatile or non-volatile memory cells, as described above.

The first array of memory devices may include an array of SRAM cells formed on, and/or in, the semiconductor material layer 10. One or more additional arrays of volatile or non-volatile memory cells may be formed at various interconnect levels above the semiconductor material layer 10. Volatile memory cells may include DRAM cells and non-volatile memory cells may include RRAM, MRAM, FRAM, PCM devices, etc.

The exemplary structure may also include a peripheral logic region 52 in which electrical connections between each array of volatile or non-volatile memory cells and a peripheral circuit including field effect transistors may be subsequently formed. Areas of the memory array region 50 and the logic region 52 may be employed to form various elements of the peripheral circuit.

Semiconductor devices such as field effect transistors (FETs) may be formed on, and/or in, the semiconductor material layer 10 during a front-end-of-line (FEOL) operation. For example, shallow trench isolation structures 12 may be formed in an upper portion of the semiconductor material layer 10 by forming shallow trenches and subsequently filling the shallow trenches with a dielectric material such as silicon oxide. Other suitable dielectric materials are within the contemplated scope of disclosure. Various doped wells (not expressly shown) may be formed in various regions of the upper portion of the semiconductor material layer 10 by performing masked ion implantation processes.

Gate structures 20 may be formed over the top surface of the substrate 8 by depositing and patterning a gate dielectric layer, a gate electrode layer, and a gate cap dielectric layer. Each gate structure 20 may include a vertical stack of a gate dielectric 22, a gate electrode 24, and a gate cap dielectric 28, which is herein referred to as a gate stack (22, 24, 28). Ion implantation processes may be performed to form extension implant regions, which may include source extension regions and drain extension regions. Dielectric gate spacers 26 may be formed around the gate stacks (22, 24, 28). Each assembly of a gate stack (22, 24, 28) and a dielectric gate spacer 26 constitutes a gate structure 20. Additional ion implantation processes may be performed that use the gate structures 20 as self-aligned implantation masks to form deep active regions.

Such deep active regions may include deep source regions and deep drain regions. Upper portions of the deep active regions may overlap with portions of the extension implantation regions. Each combination of an extension implantation region and a deep active region may constitute an active region 14, which may be a source region or a drain region depending on electrical biasing. A semiconductor channel 15 may be formed underneath each gate stack (22, 24, 28) between a neighboring pair of active regions 14. Metal-semiconductor alloy regions 18 may be formed on the top surface of each active region 14.

Field effect transistors may be formed on the semiconductor material layer 10. Each field effect transistor may include a gate structure 20, a semiconductor channel 15, a pair of active regions 14 (one of which functions as a source region and another of which functions as a drain region), and optional metal-semiconductor alloy regions 18. Complementary metal-oxide-semiconductor (CMOS) circuits 75 may be provided on the semiconductor material layer 10, which may include a periphery circuit for the array(s) of transistors, such as thin film transistors (TFTs), and memory devices to be subsequently formed.

Various interconnect-level structures may be subsequently formed, which are formed prior to formation additional memory devices and are herein referred to as lower interconnect-level structures (L0, L1, L2). In some embodiments, a two-dimensional array of TFTs and memory devices may be subsequently formed over two levels of interconnect-level metal lines. The lower interconnect-level structures (L0, L1, L2) may include a contact-level structure L0, a first interconnect-level structure L1, and a second interconnect-level structure L2. The contact-level structure L0 may include a planarization dielectric layer 31A including a planarizable dielectric material such as silicon oxide and various contact via structures 41V contacting a respective one of the active regions 14 or the gate electrodes 24 and formed within the planarization dielectric layer 31A.

The first interconnect-level structure L1 may include a first interconnect level dielectric (ILD) layer 31B and first metal lines 41L formed within the first ILD layer 31B. The first ILD layer 31B is also referred to as a first line-level dielectric layer. The first metal lines 41L may contact a respective one of the contact via structures 41V. The second interconnect-level structure L2 includes a second ILD layer 32, which may include a stack of a first via-level dielectric material layer and a second line-level dielectric material layer or a line-and-via-level dielectric material layer. The second ILD layer 32 may have formed there within second interconnect-level metal interconnect structures (42V, 42L), which includes first metal via structures 42V and second metal lines 42L. Top surfaces of the second metal lines 42L may be coplanar with the top surface of the second ILD layer 32.

Figure 1B:
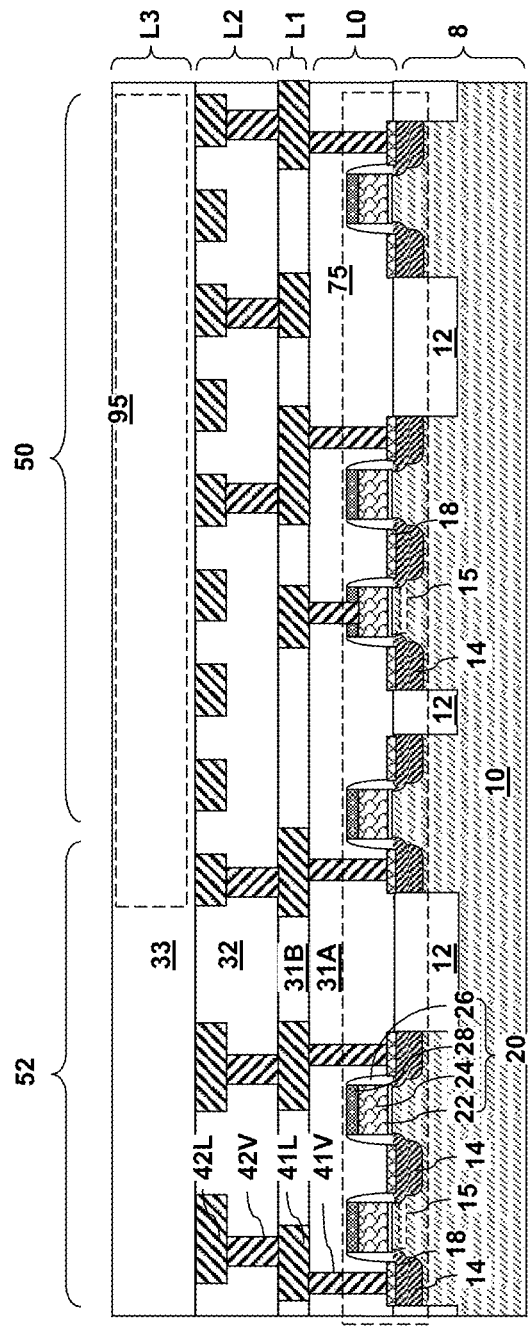
FIG. 1B is a vertical cross-sectional view of the first exemplary structure during formation of a second array memory cells, according to various embodiments.

FIG. 1B is a vertical cross-sectional view of the first exemplary structure during formation of a second array memory cells, according to various embodiments. An array 95 of volatile or non-volatile memory cells and selector devices, such as TFT selectors, may be formed in the memory array region 50 over the second interconnect-level structure L2. A third ILD layer 33 may be formed during formation of the array 95 of memory cells and TFT selector devices. The set of all structures formed at the level of the array 95 of memory cells and TFT selector devices transistors is herein referred to as a third interconnect-level structure L3.

Figure 1C:
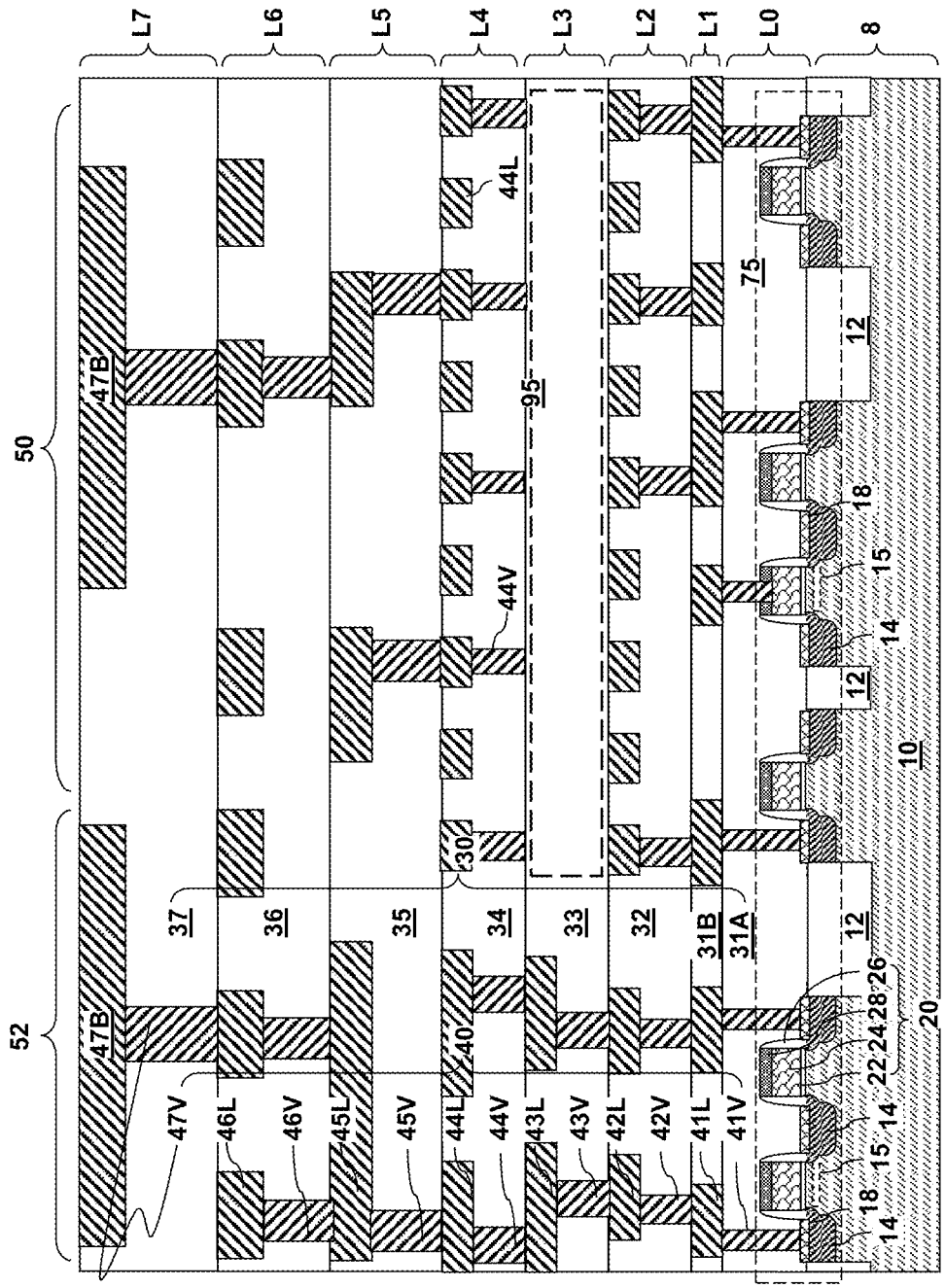
FIG. 1C is a vertical cross-sectional view of the first exemplary structure after formation of upper-level metal interconnect structures, according to various embodiments.

FIG. 1C is a vertical cross-sectional view of the first exemplary structure after formation of upper-level metal interconnect structures according to an embodiment of the present disclosure. Referring to FIG. 1C, third interconnect-level metal interconnect structures (43V, 43L) may be formed in the third ILD layer 33. The third interconnect-level metal interconnect structures (43V, 43L) may include second metal via structures 43V and third metal lines 43L. Additional interconnect-level structures may be subsequently formed, which are herein referred to as upper interconnect-level structures (L4, L5, L6, L7). For example, the upper interconnect-level structures (L4, L5, L6, L7) may include a fourth interconnect-level structure L4, a fifth interconnect-level structure L5, a sixth interconnect-level structure L6, and a seventh interconnect-level structure L7.

The fourth interconnect-level structure L4 may include a fourth ILD layer 34 having formed therein fourth interconnect-level metal interconnect structures (44V, 44L), which may include third metal via structures 44V and fourth metal lines 44L. The fifth interconnect-level structure L5 may include a fifth ILD layer 35 having formed therein fifth interconnect-level metal interconnect structures (45V, 45L), which may include fourth metal via structures 45V and fifth metal lines 45L. The sixth interconnect-level structure L6 may include a sixth ILD layer 36 having formed therein sixth interconnect-level metal interconnect structures (46V, 46L), which may include fifth metal via structures 46V and sixth metal lines 46L. The seventh interconnect-level structure L7 may include a seventh ILD layer 37 having formed therein sixth metal via structures 47V (which are seventh interconnect-level metal interconnect structures) and metal bonding pads 47B. The metal bonding pads 47B may be configured for solder bonding (which may employ C4 ball bonding or wire bonding), or may be configured for metal-to-metal bonding (such as copper-to-copper bonding).

Each ILD layer may be referred to as an ILD layer 30. Each of the interconnect-level metal interconnect structures may be referred to as a metal interconnect structure 40. Each contiguous combination of a metal via structure and an overlying metal line located within a same interconnect-level structure (L2-L7) may be formed sequentially as two distinct structures by employing two single damascene processes, or may be simultaneously formed as a unitary structure employing a dual damascene process. Each of the metal interconnect structure 40 may include a respective metallic liner (such as a layer of TiN, TaN, or WN having a thickness in a range from 2 nanometers (nm) to 20 nm) and a respective metallic fill material (such as W, Cu, Co, Mo, Ru, other elemental metals, or an alloy or a combination thereof). Other suitable materials for use as a metallic liner and metallic fill material are within the contemplated scope of disclosure. Various etch stop dielectric layers and dielectric capping layers may be inserted between vertically neighboring pairs of ILD layers 30, or may be incorporated into one or more of the ILD layers 30.

While this embodiment is described in which the array 95 of memory cells and TFT selector devices may be formed as a component of a third interconnect-level structure L3, embodiments are expressly contemplated herein in which the array 95 of memory cells and TFT selector devices may be formed as components of any other interconnect-level structure (e.g., L1-L7). Further, while this example is described using an embodiment in which a set of eight interconnect-level structures are formed, embodiments are expressly contemplated herein in which a different number of interconnect-level structures is used.

In addition, embodiments are expressly contemplated herein in which two or more arrays 95 of memory cells and TFT selector devices may be provided within multiple interconnect-level structures in the memory array region 50. While an embodiment is disclosed in which an array 95 of memory cells and TFT selector devices may be formed in a single interconnect-level structure, embodiments are expressly contemplated herein in which an array 95 of memory cells and TFT selector devices may be formed over two vertically adjoining interconnect-level structures, as described in greater detail below with reference to FIG. 1D.

Figure 1D:
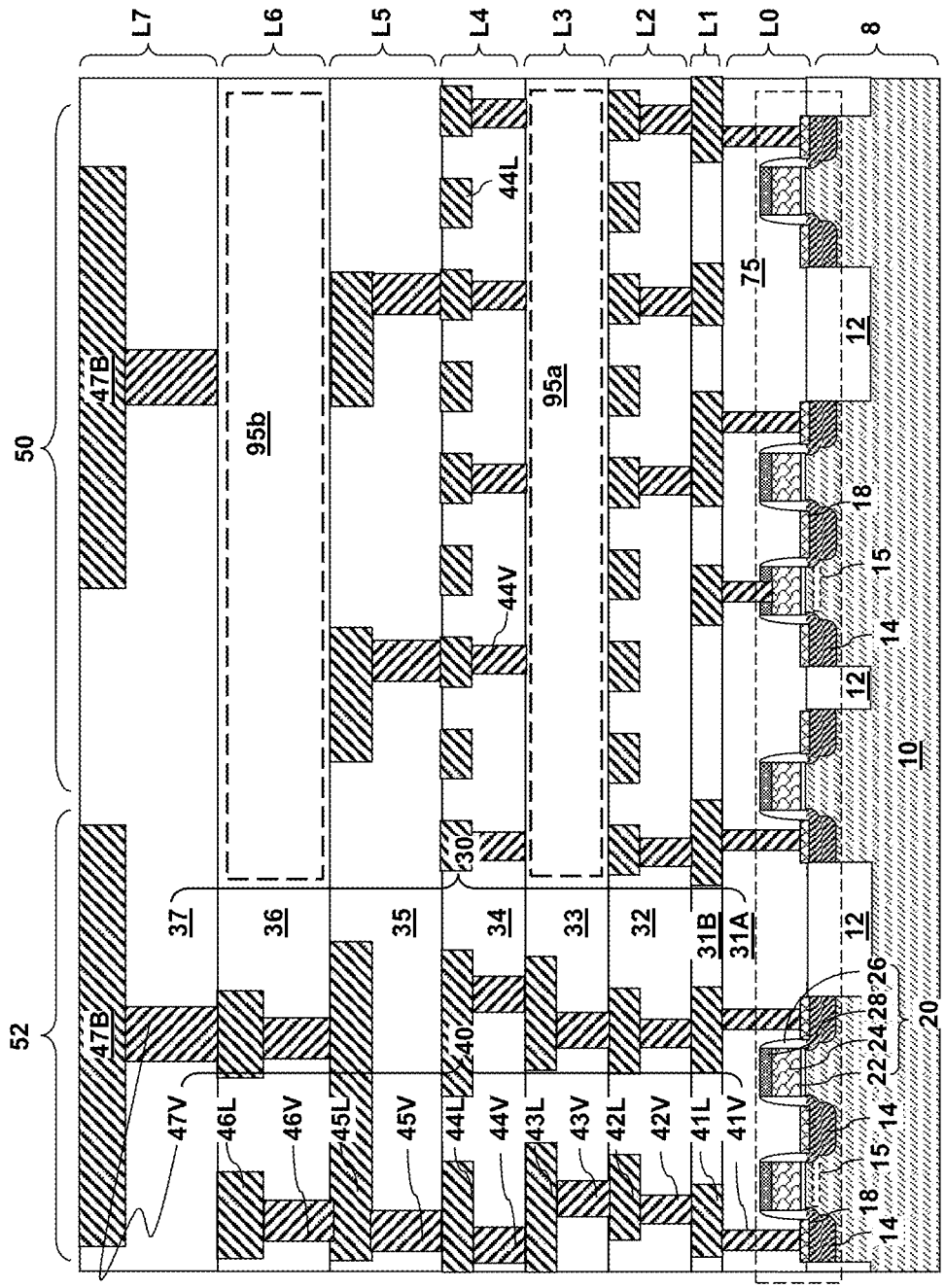
FIG. 1D is a vertical cross-sectional view of a further exemplary structure in which two arrays of memory cells have been formed over two respective vertically adjoining interconnect-level structures, according to various embodiments.

FIG. 1D is a vertical cross-sectional view of a further exemplary structure in which two arrays (95a, 95b) of memory cells and TFT selector devices may be formed over two vertically adjoining interconnect-level structures, according to various embodiments. In this example, a first array 95a of volatile or non-volatile memory cells and selector devices (e.g., TFT selectors) may be formed in the memory array region 50 over the second interconnect-level structure L2. The structure of FIG. 1D further includes a second array 95b of volatile or non-volatile memory cells and selector devices (e.g., TFT selectors) formed in the memory array region 50 over the fifth interconnect-level structure L5. As described above, one or both of the memory arrays (95a, 95b) may include volatile memory cells (e.g., DRAM cells) or may include non-volatile memory cells (e.g., FRAM cells). For example, array 95a may include DRAM or other 1T1C cells and array 95b may include FRAM cells. In other embodiments, arrays (95a, 95b) may include various other types of volatile and non-volatile memory cells.

Figure 2:
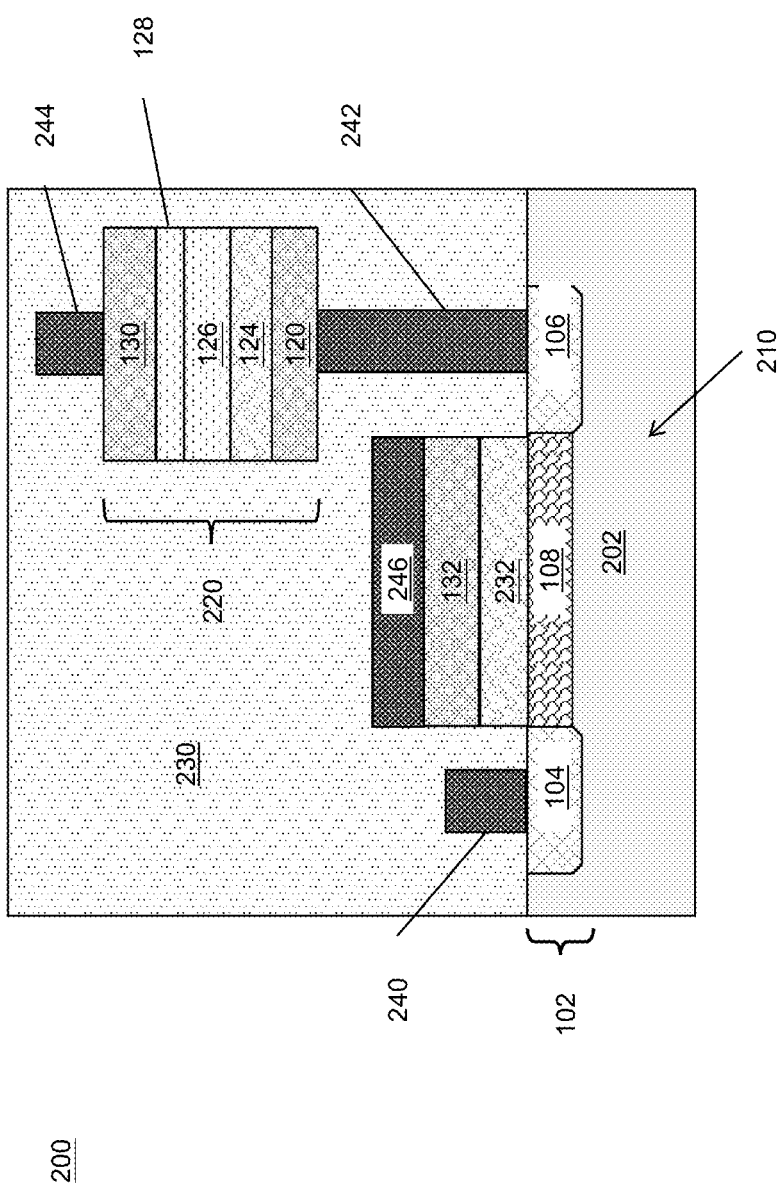
FIG. 2 is a vertical cross-sectional view of an FRAM memory structure, that may be used as a component of one or more memory arrays in the structure of FIGS. 1B-1D, according to various embodiments.

FIG. 2 is a vertical cross-sectional view of a FRAM memory structure 200, that may be used as a component of one or more memory arrays in the structure of FIGS. 1B-1D, according to various embodiments. The memory structure 200 may include a transistor 210 and a ferroelectric tunnel junction (FTJ) memory cell 220. Accordingly, the memory structure 200 may have a 1 transistor-1 capacitor (1T1C) configuration. Any other suitable configuration including more than one transistor and/or more than one capacitor are within the scope of the present disclosure. For example, a memory structure may include a 2T2C configuration. The transistor 210 may be disposed on a substrate 202. The substrate 202 may be a semiconductor substrate, such as an amorphous silicon or polysilicon substrate. In other embodiments, the substrate 202 may be a dielectric layer, such as an interconnect dielectric layer.

The transistor 210 may include a semiconductor layer 102 including a source region 104, a drain region 106, and a channel region 108 disposed there between. In some embodiments the transistor 202 may be a complementary metal oxide semiconductor (CMOS) transistor formed in a FEOL. In such embodiments, the semiconductor layer 102 may include polysilicon, amorphous silicon, silicon, or compound including silicon. In other embodiments, the transistor 210 may also be a TFT using a semiconducting oxide, such as InGaZnO (IGZO), indium tin oxide (ITO), InWO, InZnO, InSnO, GaOx, InOx, etc. In embodiments in which the transistor 210 is a TFT, the substrate 202 may be a layer formed during a BEOL process.

A high-k dielectric layer 232 may be disposed on the channel region 108. In various embodiments, the high-k dielectric layer 232 may have a thickness in a range from approximately 0.5 nm to approximately 5.0 nm, such as from 1 nm to 4 nm, although larger or smaller thicknesses may be used. Herein, high-k dielectric materials have a dielectric constant greater than 3.9 and may include, but are not limited to, silicon nitride ($SiN_x$), hafnium oxide ($HfO_2$), hafnium silicon oxide (HfSiO), hafnium tantalum oxide (HfTaO), hafnium titanium oxide (HfTiO), hafnium zirconium oxide ($Hf_{0.5}Zr_{0.5}O_2$) (HZO)), tantalum oxide ($Ta_2O_5$), aluminum oxide ($Al_2O_3$), lanthanum aluminate ($LaAlO_3$), hafnium dioxide-alumina ($HfO_2$—$Al_2O_3$), zirconium oxide ($ZrO_2$), magnesium oxide (MgO), combinations thereof, etc. Other suitable dielectric materials are within the scope of the present disclosure.

A gate electrode 132 may be disposed on the high-k dielectric layer 232. The gate electrode 132 may be formed of any suitable electrically conductive material, using any suitable deposition process.

The FTJ 220 may include a bottom electrode 120, a high-k dielectric 124, a ferroelectric layer 126, an interface metal 128, and a top electrode layer 130.

In the memory structure 200, the source region 104 may be electrically connected to a bit line 240, the drain region 106 may be electrically connected to the bottom electrode layer 120 by a drain via contact 242, and the top electrode layer 130 may be electrically coupled to a plate line 244. The gate electrode 132 may be electrically connected to a word line 246. A dielectric layer 230, such as an interconnect dielectric layer, may be disposed on the substrate 202. For example, the high-k dielectric layer 232, gate electrode 132, word line 246, bit line 240, drain via contact 242, and FTJ 220 may be embedded in the dielectric layer 230.

The ferroelectric layer 126 may include any suitable ferroelectric material, such as HfO, $HfO_2$, ZrO2, $Hf_{0.5}Zr_{0.5}O_2$ (HfZrO), HfSiO, HfLaO, AlScN, $PbZrO_3$ (PBT), $Pb[Zr_xTi_{1-x}]O3$, ($0 \le x \le 1$) (PZT), $Pb_{1-x}La_xZr_{1-y}Ti_yO3$ (PLZT), $BaTiO_3$, $PbTiO_3$, $PbNb_2O_6$, $LiNbO_3$, $LiTaO_3$, $PbMg_{1/3}Nb_{2/3}O_3$ (PMN), $PbSc_{1/2}Ta_{1/2}O_3$ (PST), $SrBi_2Ta_2O_9$ (SBT), $Bi_{1/2}Na_{1/2}TiO_3$, combinations thereof, etc. In some embodiments, the ferroelectric layer 126 may be formed of HfO, $HfO_2$, HfZrO, PZT, $PbTiO_3$, HfLaO, or the like. Other suitable ferroelectric materials are within the contemplated scope of disclosure.

Alternatively, the ferroelectric layer 126 may be formed by depositing an FE material using any suitable deposition method, such as PVD, spin coating and annealing, sputtering, CVD, ALD, PECVD, spray pyrolysis, pulsed laser deposition (PLD) or combinations thereof. In various embodiments, the ferroelectric layer 126 may be a ferroelectric film that is thin enough to allow tunneling of electrons there through. For example, the thickness of the ferroelectric layer 126 may be about 1 nm to about 50 nm thick, such as from about 2 nm to about 25 nm, or about 10 nm thick.

The gate electrode 132 may include an electrically conductive material, and may be formed by any suitable deposition process, with respect to the bottom and top electrodes 120 and 130. In some embodiments, the gate electrode 132 may include an n-type work function material, such as Ta, TiAl, etc., or may include a n-type work function material, such as TiN, $WO_3$, etc. The work function of the gate electrode 132 may be selected based on the conductivity type of the channel region 108. In other embodiments, the gate electrode 132 may be formed using a replacement gate process. For example, the gate electrode 132 may formed to include a sacrificial material layer such as a p-doped polysilicon material, n-doped polysilicon material, a silicon-germanium alloy, amorphous carbon or a dielectric material. In a subsequent processing step, the sacrificial material layer may be replaced with a high conductive metal layer.

In various embodiments, the source region 104 may be electrically connected to a source electrode or bit line through contact vias (not shown). The drain region 106 may be electrically connected to a drain electrode through contact vias (not shown). The gate electrode 132 may be electrically connected to a word line of a semiconductor device, such as a memory device.

In alternate embodiments, a DRAM structure may be formed to have essentially the same components as the FRAM memory structure 200 of FIG. 2 with the exception of the ferroelectric layer 126. For example, replacement of the ferroelectric layer 126 with a dielectric or high-k dielectric results in the formation of a capacitor structure such that the capacitor structure coupled with the transistor 210 forms a DRAM structure. Accordingly, a DRAM memory structure may have a 1 transistor-1 capacitor (1T1C) configuration. Any other suitable configuration including more than one transistor and/or more than one capacitor are within the scope of the present disclosure. For example, a memory structure may include a 2T2C configuration. A DRAM memory structure, formed in this way, may have similar electrical connections to that of the FRAM memory structure 200 of FIG. 2. In this regard, the source region 104 may be electrically connected to a bit line 240, the drain region 106 may be electrically connected to the bottom electrode layer 120 by a drain via contact 242, and the top electrode layer 130 may be electrically coupled to a plate line 244. The gate electrode 132 may be electrically connected to a word line 246.

In still further embodiments, the high-k dielectric layer 232 in FIG. 2 may be replaced with the ferroelectric material to thereby form a ferroelectric field-effect transistor (FeFET). In such an embodiment, the FTJ structure 220 may be omitted and the FeFET structure may be configured as an FRAM memory device.

Figure 3:
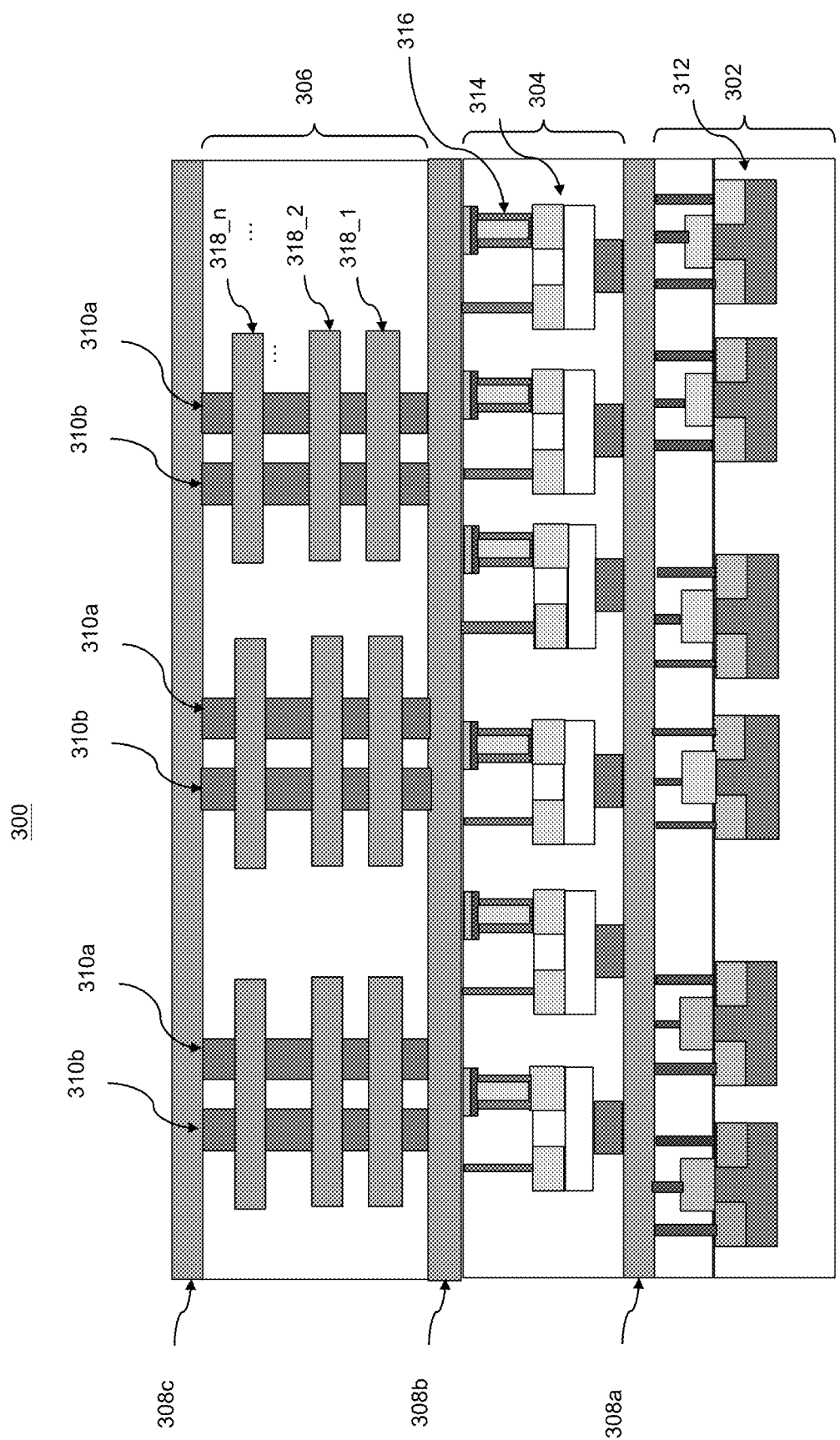
FIG. 3 is a vertical cross-sectional view of a memory structure including multiple arrays of memory devices on a single die, according to various embodiments.

FIG. 3 is a vertical cross-sectional view of a memory structure 300 including multiple arrays of memory devices on a single die, according to various embodiments. The memory structure 300 may include a first memory region 302 including a first array of field effect transistor devices 312, a second memory region 304 including a second array of memory devices 314, and a third memory region 306 including a third array of memory devices 318l, 318_2, . . . 318_n. The memory structure 300 may further include at least one data bus laterally extending across the first memory region 302, the second memory region 304, and third memory region 306, and configured to provide data transfer among the first memory array, the second memory array, and the third memory array. In this regard, the data bus may include lateral interconnect structures 308a, 308b, and 308c as well as vertical interconnect structures 310a and 310b. In certain embodiments, the data bus may be configured as a 1024 bit data bus.

The first memory array 302 may include field effect transistor devices 312 formed at the substrate material layer 10 in a front-end-of-line (FEOL) process, as described above with reference to FIG. 1A. For example, transistor devices 312 may be formed as CMOS circuits 75 located on the semiconductor material layer 10. Some of the transistor devices 312 may be configured as SRAM memory devices. In this way, the first memory array may be an array of SRAM memory devices. Other transistor devices 312 within the first memory region 302 may be configured to perform computing logic functions, and still other transistor devices 312 may be configured as peripheral circuits. The peripheral circuits formed in the first memory region 302 may be configured to control the first memory array, the second array, and the third memory array in cooperation with the logic circuits in the first memory region 302.

The second memory region 304 may be formed above the first memory region 302 on the same die and may be formed as an integrated structure, as described above with reference to FIGS. 1B to 1D. In one embodiment, the second memory region 304 may include an array 95 (e.g., see FIGS. 1B and 1C) of volatile or non-volatile memory cells and selector devices, such as TFT selectors. As described above, the array 95 may be formed over the second interconnect-level structure L2. In other embodiments, the array 95 may be formed over other interconnect-level structures (e.g., L3-L7).

The memory devices 314 formed in the second memory region 304 (e.g., see FIG. 3) may include FRAM memory devices 200, or FeFET devices, as described above with reference to FIG. 2. As such, memory devices 314 may include a storage device 316. In the example of FIG. 2, the storage device 316 may be configured as a FTJ structure 220 including a ferroelectric layer 126. In other embodiments, FTJ structure 220 may include an anti-ferroelectric layer 126. Alternatively, as described above, memory devices 314 may be configured as 1T1C devices. Such 1T1C devices may have similar components as those of the FRAM structure 200 with the exception of the ferroelectric layer 126. By substitution of a dielectric layer, or high-k dielectric layer in place of the ferroelectric layer 126, a capacitor structure may be formed in place of the FTJ structure 220. The resulting device may have a 1T1C configuration and may be configured to operate as a DRAM device or other 1T1C device. Other embodiments may include various other types of memory devices 314 that may be configured as 1T1C devices, 2T2C devices, etc.

The memory devices 318l, 318_2, . . . 318_n (where n is an integer greater than 2) formed in the third memory region 306 (e.g., see FIG. 3) may include various types of volatile or non-volatile memory devices. For example, memory devices 318 may include a plurality of memory devices 318l, 318_2, . . . 318_n configured in a stacked arrangement, as shown in FIG. 3. In one embodiment, each of memory devices 318l, 318_2, . . . 318_n may be configured as a two-dimensional array of FRAM or FeFET devices. For example, each of memory devices 318l, 318_2, . . . 318_n may be configured as a FRAM chip, with each FRAM chip configured as a two-dimensional array of FRAM or FeFET devices. The vertical interconnect structures 310a and 310b may be configured such that the plurality of FRAM chips 318l, 318_2, . . . 318_n may be configured as a 2.5-dimensional FRAM array.

In further embodiments, the plurality of memory devices 318l, 318_2, . . . 318_n may be integrally formed in an BEOL process as a 3-dimensional FRAM array. As such, the 3-dimensional FRAM array many include memory devices 318_1, 318_2, . . . 318_n formed at various interconnect level structures, as described above with reference to FIGS. 1B to 1D. For example, the plurality of memory devices 318l, 318_2, . . . 318_n may be formed as the memory array 95b formed over the over the fifth interconnect-level structure L5, as described above with reference to FIG. 1D. Similarly, the second memory array may be formed as the memory array 95a over the second interconnect-level structure L2, as described above with reference to FIG. 1D. In an embodiment, the first memory array may be formed as CMOS circuits 75 that provided on the semiconductor material layer 10, as described above with reference to FIGS. 1A to 1D.

In the above-described example, the third memory array that is located in third memory region 306 (e.g., memory array 95b in FIG. 1D) may be configured as a 2.5-dimensional or 3-dimensional memory array. In other embodiments, one or both of the second memory array, formed in second memory region 304, and the third memory array, formed in third memory region 306, may be configured as a 2.5-dimensional or 3-dimensional array. Further, the 2.5-dimensional or 3-dimensional array may include word lines (not shown) that are shared between a plurality of stacked active device layers within the 2.5-dimensional or 3-dimensional memory array. In further embodiments, the word lines may be formed as lateral interconnect structures that couple memory devices in a plurality of active device layers. In this regard, word lines may be formed as part of the lateral interconnect structures 308a, 308b, and 308c. In further embodiments, word lines may be formed as part of the vertical interconnect structures 310a and 310b.

In further embodiments, the data bus (e.g., see interconnect structures 308a, 308b, 308c, 310a, and 310b in FIG. 3) may include common bit lines (not shown) that may be switchably shared between the first memory array, the second memory array, and the third memory array. As such, the data bus may be configured to switchably transfer data among the first memory array, the second memory array, and the third memory array. In this regard, the peripheral devices located in first memory region 302 may include various bus selector switches that control connections between various parts of the data bus. For example, data may be transferred between one memory array and another memory array by switching on connections between common bit lines that are shared between the two arrays.

In one embodiment, the first memory array that is located in first memory region 302 may include an array of SRAM devices, the second memory array that is located in second memory region 304 (see also memory array 95a of FIG. 1D) may include an array of DRAM, FRAM, FeFET, or other 1T1C devices, and the third memory array that is located in third memory region 306 may include a 2.5-dimensional or 3-dimensional FRAM array. Further, the peripheral devices located in first memory region 302 may be configured to provide control access across the first memory array, the second memory array, and the third memory array boundaries. As such, the data bus may be configured to selectively control data transfer between the first (SRAM) memory array and the second (1T1C) memory array, between the second (1T1C) memory array and the third (FRAM) memory array, and between the first (SRAM) memory array and the third (FRAM) memory array. The peripheral devices may include sense amplifiers and decoder circuits for the one or more respective first memory array, the second memory array, and the third memory array. The peripheral devices may further include data bus switching devices that may be configured to control data transfer between any of the first memory array, the second memory array, and the third memory array.

The above-described embodiments include peripheral devices that may be located in the semiconductor material layer 10 (e.g., see FIGS. 1A to 1D) of the die. Such devices may be a subset of transistor devices 312 located in the first memory region 302 (e.g., see FIG. 3). Also, as described above, the transistor devices 312 formed in the first memory region 302 may further include devices configured as logic devices to perform computing logic operations. In further embodiments, additional peripheral devices (not shown) may be formed in the second memory region 304 and the third memory region 306. These additional peripheral devices may be formed as TFT devices in a BEOL process, as described above. Such TFT devices, formed at the second memory region 304 and at the third memory region 306 may also be configured to perform logic operations.

Figure 4:
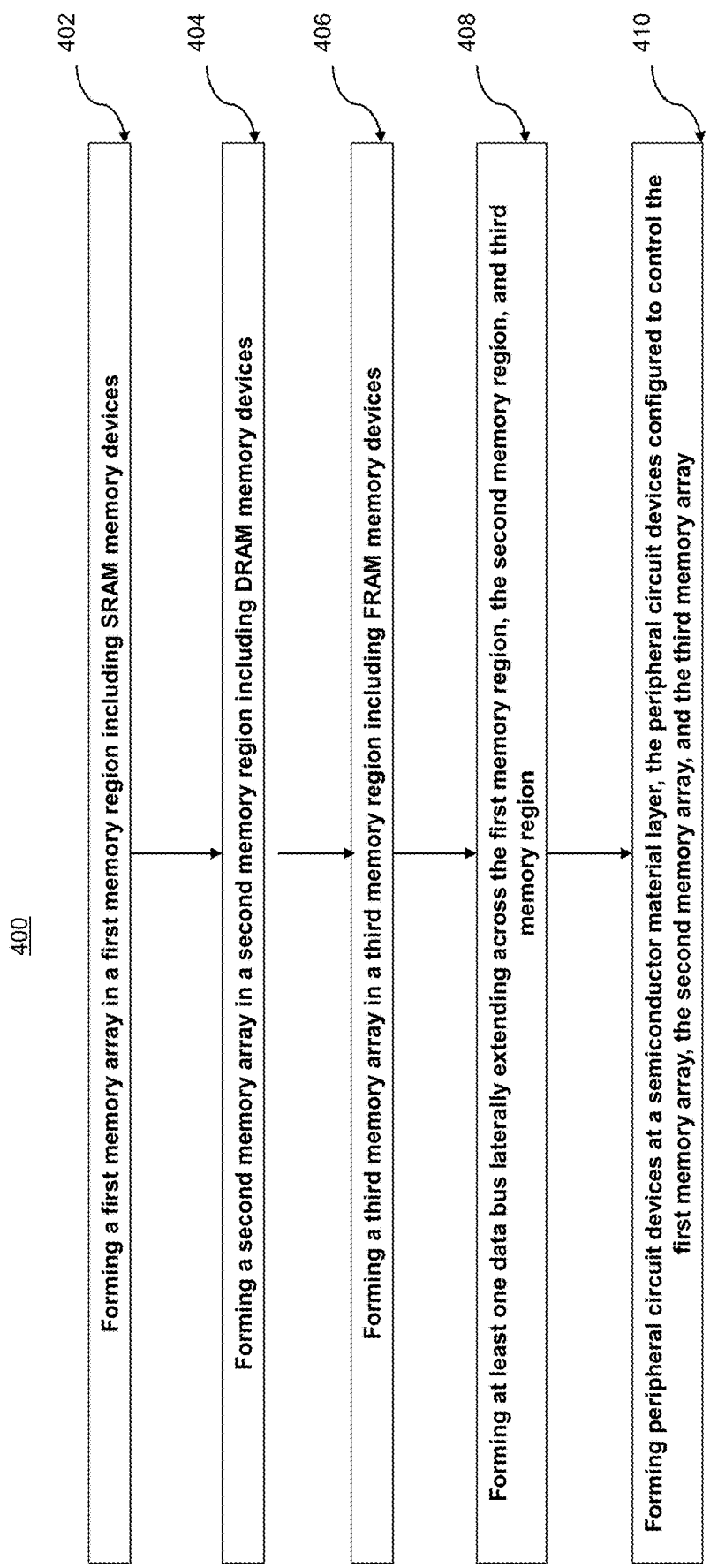
FIG. 4 is a flowchart illustrating operations of a method of fabricating a memory structure, according to various embodiments.

FIG. 4 is a flowchart illustrating operations of a method 400 of fabricating a memory structure, according to various embodiments. In a first operation 402, the method 400 may include forming a first memory array including SRAM memory devices. As described above, the first memory array may be formed in the first memory region 302 as CMOS transistor devices 312 formed in the semiconductor material layer 10 (e.g., see FIGS. 1A to 1D). In operation 402, the method 400 may include forming a second memory array including 1T1C devices. The second memory array may be formed in the second memory region 304. In other embodiments, the second memory array may include FRAM or FeFET devices (e.g., see FIG. 2) or other 1T1C, 2T2C, etc., memory devices formed in the second memory region 304. In operation 406, the method 400 may include forming a third memory array including FRAM or FeFET memory devices. The third memory array may be formed in the third memory region 306 and may be configured as a 2.5-dimensional or 3-dimensional array of FRAM or FeFET devices.

In operation 408, the method 400 may include forming at least one data bus laterally extending across the first memory region 302, the second memory region 304, and third memory region 306. As described above, the data bus may include lateral interconnect structures 308a, 308b, and 308c, as well as vertical interconnect structures 310a, and 310b (e.g., see FIGS. 1A to 1D, and FIG. 3). The data bus may be configured provide data transfer among the first memory array, the second memory array, and the third memory array.

In operation 410, the method 400 may include forming peripheral circuit devices at a semiconductor material layer 10 of the die (e.g., see FIGS. 1A to 1D). Such peripheral devices may be a subset of CMOS transistor devices 312 that may be formed in first memory region 302 (e.g., see FIG. 3). The peripheral devices may include sense amplifiers and decoder circuits for the one or more respective first memory array, the second memory array, and the third memory array. The peripheral devices may further include data bus switching devices that may be configured to control data transfer between the first memory array, the second memory array, and the third memory array. In further embodiments, peripheral devices may also be formed as TFT devices in the second memory region 304 and the third memory region 306.

The method 400 may further include forming the data bus as a plurality of interconnect level structures (e.g., see FIGS. 1A to 1D). As described above, the method 400 may include forming the first memory array as SRAM memory devices on the semiconductor material layer 10 of the die; forming the second memory array as 1T1C memory devices over a first interconnect level structure of the plurality of interconnect level structures (e.g., over interconnect level L2 in FIGS. 1B to 1D); forming the third memory array as FRAM or FeFET memory devices over a second interconnect level structure of the plurality of interconnect level structures (e.g., over interconnect level L5 in FIGS. 1B to 1D); and forming the peripheral circuit devices that may be configured to provide control access across boundaries of the first memory array, boundaries of the second memory array and boundaries of the third memory array. In this regard, the method 400 may include forming the peripheral devices to include sense amplifiers and decoder circuits for the one or more of the respective first memory array, the second memory array, and the third memory array. The method 400 may further include forming the peripheral circuit devices to include data bus switching devices that are configured to control data transfer between the first memory array, the second memory array, and the third memory array.

The method 400 may further include forming TFT devices located at one or both of the first interconnect level (i.e., in memory region 304) and the second interconnect level (i.e., in memory region 306). The method 400 may further include forming computing logic devices located on the semiconductor material layer 10 of a die (e.g., see FIGS. 1A to 1D). Further, forming the at least one data bus may further include coupling the computing logic devices to the first memory array, the second memory array, the third memory array, and the peripheral circuit devices. The method 400 may further include forming one or more of the second memory array and the third memory array as a 3-dimensional memory array including word lines that are shared between two or more stacked active device layers within the 3-dimensional memory array. In other embodiments, one or more of the second memory array and the third memory array may be configured as a 2.5-dimensional array.

Figure 5:
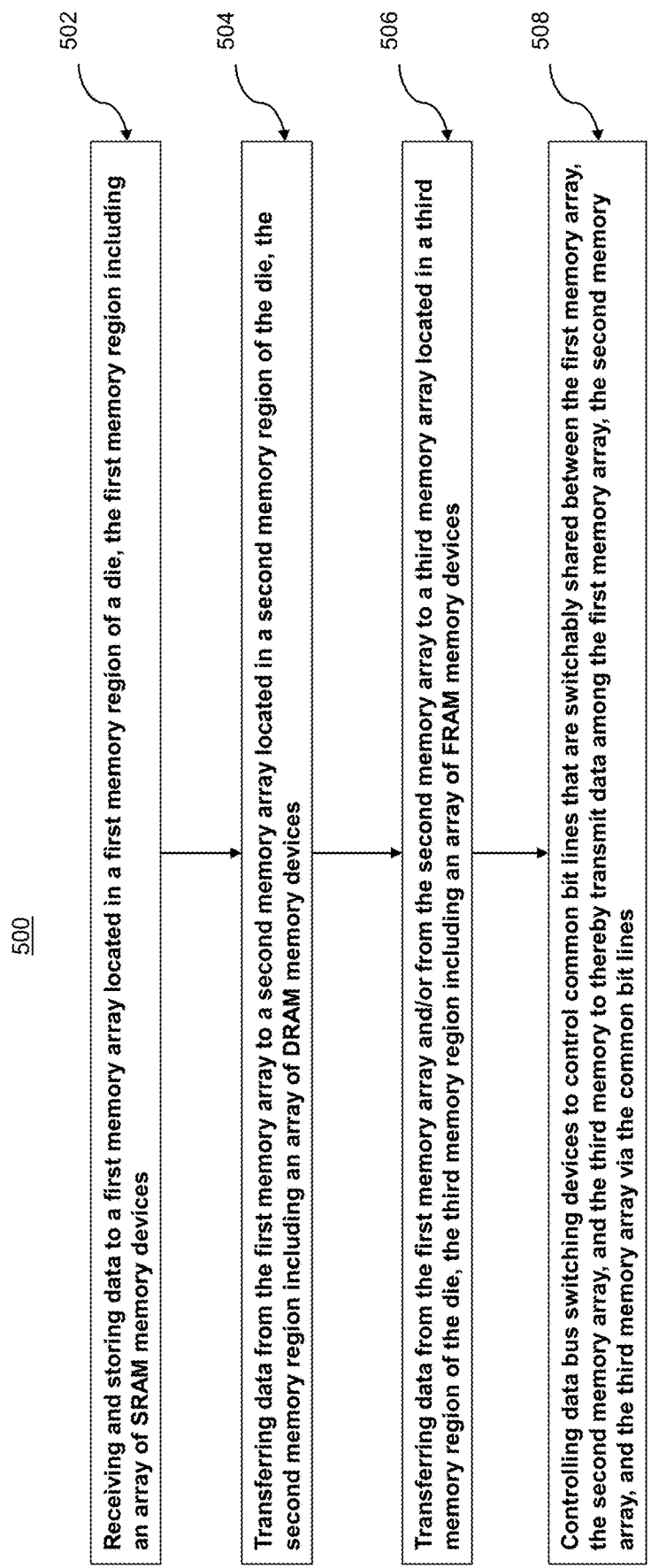
FIG. 5 is a flowchart illustrating operations of a method of operating a memory structure, according to various embodiments.

FIG. 5 is a flowchart illustrating operations of a method 500 of operating a memory structure, according to various embodiments. In operation 502, the method 500 may include receiving and storing data to a first memory array located in a first memory region 302 of a die, the first memory region 302 including an array of SRAM memory devices. In operation 504, the method 500 may further include transferring data from the first memory array to a second memory array located in a second memory region 304 of the die. In some embodiments, the second memory region 304 may include an array of 1T1C memory devices. In other embodiments, the second memory region 304 may include an array of FRAM or FeFET memory devices. In operation 506, the method 500 may further include transferring data from the first memory array and/or from the second memory array to a third memory array located in a third memory region 306 of the die, the third memory region an array of FRAM or FeFET memory devices (e.g., see FIG. 2 and related description, above).

According to method 500, the data may be transferred to and from the first memory array, the second memory array, and the third memory array via at least one data bus laterally extending across the first memory region 302, the second memory region 304, and third memory region 306. Further, according to method 500, the transfer of data to and from the first memory array, the second memory array, and the third memory array may be controlled by peripheral circuit devices formed at a semiconductor material layer 10 (e.g., see FIGS. 1A to 1D) of the memory structure.

In operation 508, the method 500 may further include controlling data bus switching devices to control common bit lines that are switchably shared between the first memory array, the second memory array, and the third memory to thereby transmit data among the first memory array, the second memory array, and the third memory array via the common bit lines.

With reference to FIGS. 1A-3, a memory structure 300 may be provided. The memory structure 300 may include: a first memory region 302 that may include a first memory array of SRAM memory devices; a second memory region 304 that may include a second memory array of 1T1C memory devices; a third memory region 306 that may include a third memory array of FRAM or FeFET memory devices; at least one data bus laterally extending across the first memory region 302, the second memory region 304, and third memory region 306 and configured to provide data transfer among the first memory array, the second memory array, and the third memory array; and peripheral circuit devices formed at a semiconductor material layer of the memory structure 300, the peripheral circuit devices configured to control the first memory array, the second memory array, and the third memory array.

In one embodiment, at least one of the second memory array and the third memory array may be configured as a 3-dimensional memory array that may include word lines that may be shared between a plurality of stacked active device layers within the 3-dimensional memory array. In one embodiment, the word lines may be formed as lateral interconnect structures 308a, 308b, 308c that couple memory devices of the 3-dimensional memory array that comprises the plurality of stacked active device layers. In one embodiment, the peripheral circuit devices formed at a semiconductor material layer of the memory structure may be located beneath the second memory array and beneath the third memory array. That is, the area used to form the peripheral circuit devices overlaps with the area used to form the second memory array and the third memory array.

In another embodiment, the word lines may be formed as vertical interconnect structures 310a, 310b that couple memory devices of the 3-dimensional memory array that comprises the plurality of stacked active device layers. In one embodiment, the data bus may include common bit lines that may be switchably shared between the first memory array, the second memory array, and the third memory, the data bus configured to switchably transfer data among the first memory array, the second memory array, and the third memory array. In one embodiment, the data bus may include a plurality of interconnect level structures; the SRAM memory devices of the first memory array may be located on the semiconductor material layer 8 of the memory structure 300; the 1T1C memory devices may be located over a first interconnect level structure of the plurality of interconnect level structures; the FRAM or FeFET memory devices may be located over a second interconnect level structure of the plurality of interconnect level structures; and the peripheral circuit devices may be configured to provide control access across boundaries of the first memory array, boundaries of the second memory array, and boundaries of the third memory array. In one embodiment, the peripheral circuit devices may include sense amplifiers and decoder circuits for the one or more respective first memory array, the second memory array, and the third memory array. In one embodiment, the peripheral circuit devices may further include data bus switching devices that are configured to control data transfer between the first memory array, the second memory array, and the third memory array. In one embodiment, the peripheral circuit devices may further include thin film transistor devices located at least one of the first interconnect level and the second interconnect level. In one embodiment, the memory structure 300 may include computing logic devices located at the semiconductor material layer of a die, wherein the data bus couples the computing logic devices to the first memory array, the second memory array, the third memory array, and the peripheral circuit devices.

The various embodiments disclosed herein may provide advantages for certain computing applications that require fast and very high-bandwidth memory access. In applications in neuromorphic computing and machine learning, for example, multiple fast high-bandwidth memory arrays are needed. The various embodiments disclosed herein may overcome drawbacks of conventional memory architectures by providing a memory structure having multiple memory arrays formed on a single die. In this regard, disclosed embodiments may include an SRAM memory array formed at a semiconductor material level of a die, a 1T1C array formed above the SRAM array on the same die, and a 3-dimensional FRAM array formed above the 1T1C array on the same die.

The memory structure may further include a data bus that allows massive data IO between the three memory arrays (i.e., the first memory array, the second memory array, and the third memory array). For example, in one embodiment the data bus may be a 1024 bit data bus. Peripheral control devices may further be provided at the semiconductor material layer and may be configured to control data transfer between the various memory arrays. Placing such control circuitry below the 1T1C and FRAM arrays reduces the overall area of the memory structure and allows data bus connections to be shorter, thereby improving speed and bandwidth of memory access. In some embodiments, bandwidth may be increased by factors of between 32 and 64 relative to conventional memory structures. Similar increases in the speed of data transfer may be achieved in certain embodiments.

The foregoing outlines features of several embodiments so that those skilled in the art may better understand the aspects of this disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of the present disclosure.

What is claimed is:

1. A memory structure, comprising:
    a first memory region comprising a first memory array of SRAM memory devices formed at a semiconductor material layer;
    a second memory region comprising a second memory array of 1T1C memory devices formed over the first memory region;
    a third memory region comprising a third memory array of FeFET memory devices formed over the second memory region;
    at least one data bus laterally extending across the first memory region, the second memory region, and third memory region and configured to provide data transfer among the first memory array, the second memory array, and the third memory array; and
    peripheral circuit devices formed at a semiconductor material layer of the memory structure, the peripheral circuit devices configured to control the first memory array, the second memory array, and the third memory array,
    wherein the first memory region, the second memory region, the third memory region, the data bus, and the peripheral circuit devices are all formed on a single die,
    wherein the peripheral circuit devices include data bus switching devices configured to selectively control data transfer between the first memory array of SRAM memory devices and the second memory array of 1T1C memory devices, between the second memory array of 1T1C memory devices and third memory array of FeFET memory devices, and between the first memory array of SRAM memory devices and the third memory array of FeFET memory devices, and
    wherein the at least one data bus includes common bit lines that are switchably shared among the first memory array, the second memory array, and the third memory array, and the peripheral circuit devices include: bus selector switches configured to dynamically activate specific segments of the common bit lines during data transfer operations, and decoder circuits configured to address and access specific memory cells within each memory array.

2. The memory structure of claim 1, wherein at least one of the second memory array and the third memory array is configured as a 3-dimensional memory array comprising word lines that are shared between a plurality of stacked active device layers within the 3-dimensional memory array.

3. The memory structure of claim 2, wherein the word lines are formed as lateral interconnect structures that couple memory devices of the 3-dimensional memory array that comprises the plurality of stacked active device layers.

4. The memory structure of claim 2, wherein the word lines are formed as vertical interconnect structures that couple memory devices of the 3-dimensional memory array that comprises the plurality of stacked active device layers.

5. The memory structure of claim 4, wherein the peripheral circuit devices formed at a semiconductor material layer of the memory structure are located beneath the second memory array and beneath the third memory array.

6. The memory structure of claim 1, wherein the peripheral circuit devices are a subset of complementary metal-oxide semiconductor (CMOS) transistor devices formed in the first memory region.

7. The memory structure of claim 1, wherein:
    the at least one data bus comprises a plurality of interconnect level structures;
    the 1T1C memory devices are located over a first interconnect level structure of the plurality of interconnect level structures;
    the FeFET memory devices are located over a second interconnect level structure of the plurality of interconnect level structures; and
    the peripheral circuit devices are configured to provide control access across boundaries of the first memory array, boundaries of the second memory array, and boundaries of the third memory array.

8. The memory structure of claim 7, wherein the peripheral circuit devices comprise sense amplifiers for the one or more respective first memory array, the second memory array, and the third memory array.

9. The memory structure of claim 8, wherein the peripheral circuit devices further comprise data bus switching devices that are configured to control data transfer between the first memory array, the second memory array, and the third memory array.

10. The memory structure of claim 8, wherein the peripheral circuit devices further comprise thin film transistor devices located at least one of the first interconnect level and the second interconnect level.

11. The memory structure of claim 1, further comprising:
    computing logic devices located at the semiconductor material layer of a die,
    wherein the data bus couples the computing logic devices to the first memory array, the second memory array, the third memory array, and the peripheral circuit devices.

12. A memory structure, comprising:
    a first memory region comprising SRAM memory devices formed at a semiconductor material layer;
    a first interconnect level structure formed over the first memory region;
    a second memory region comprising 1TIC memory devices formed over the first interconnect level structure such that the first interconnect level structure separates the second memory region from the first memory region;

a second interconnect level structure formed over the second memory region; and a third memory region comprising FeFET memory devices formed over the second interconnect level structure such that the second interconnect level structure separates the third memory region from the second memory region;

peripheral circuit devices comprising data bus switching devices configured to selectively control data transfer between the first memory region of SRAM memory devices and the second memory region of 1T1C memory devices, between the second memory region of 1T1C memory devices and third memory region of FeFET memory devices, and between the first memory region of SRAM memory devices and the third memory region of FeFET memory devices; and common bit lines switchably shared among the first memory array, the second memory array, and the third memory array, wherein the peripheral circuit devices include bus selector switches configured to dynamically activate specific segments of the common bit lines during data transfer operations, and decoder circuits configured to address and access specific memory cells within each memory array, wherein the first memory region, the first interconnect level structure, the second memory region, the second interconnect level structure, and the third memory region are all formed on a single die.

13. The memory structure of claim 12, further comprising at least one data bus laterally extending across the first memory region, the second memory region, and third memory region and configured to provide data transfer among the first memory array, the second memory array, and the third memory array.

14. The memory structure of claim 12, wherein the peripheral circuit devices are formed at the semiconductor material layer, wherein the peripheral circuit devices are configured to control the first memory array, the second memory array, and the third memory array.

15. The memory structure of claim 14, wherein the peripheral circuit devices formed at the semiconductor material layer of the memory structure are located beneath the second memory array and beneath the third memory array.

16. A memory structure, comprising:

a first memory region formed at a semiconductor material layer comprising a first memory array volatile memory devices, the first memory region comprising SRAM memory devices;

a second memory region comprising a second memory array of non-volatile memory devices formed over the first memory region, the second memory region comprising 1T1C memory devices;

a third memory region formed over the second memory region comprising a third memory array configured as a 3-dimensional memory array comprising word lines that are shared between a plurality of stacked active device layers within the 3-dimensional memory array, the third memory region comprising FeFET memory devices;

at least one data bus laterally extending across the first memory region, the second memory region, and third memory region and configured to provide data transfer among the first memory array, the second memory array, and the third memory array; and peripheral circuit devices comprising data bus switching devices configured to selectively control data transfer between the first memory region of SRAM memory devices and the second memory region of 1T1C memory devices, between the second memory region of 1T1C memory devices and third memory region of FeFET memory devices, and between the first memory region of SRAM memory devices and the third memory region of FeFET memory devices, wherein the at least one data bus includes common bit lines that are switchably shared among the first memory array, the second memory array, and the third memory array, and the peripheral circuit devices include: bus selector switches configured to dynamically activate specific segments of the common bit lines during data transfer operations, and decoder circuits configured to address and access specific memory cells within each memory array, and wherein the first memory region, the second memory region, the third memory region, and the data bus, are all formed on a single die.

17. The memory structure of claim 16, wherein the word lines are formed as vertical interconnect structures that couple memory devices of the 3-dimensional memory array that comprises the plurality of stacked active device layers.

18. The memory structure of claim 16, wherein the peripheral circuit devices are formed at a semiconductor material layer of the memory structure and configured to control the first memory array, the second memory array, and the third memory array, wherein the peripheral circuit devices are located beneath the second memory array and beneath the third memory array.

19. The memory structure of claim 16, wherein the peripheral circuit devices are a subset of complementary metal-oxide semiconductor (CMOS) transistor devices formed in the first memory region.

20. The memory structure of claim 16, wherein the peripheral circuit devices further comprise thin film transistor devices located at an interconnect level.

* * * * *